(12) United States Patent
Mussari et al.

(10) Patent No.: US 10,689,274 B2
(45) Date of Patent: Jun. 23, 2020

(54) WASTEWATER TREATMENT APPARATUS TO ACHIEVE CLASS B BIOSOLIDS USING CHLORINE DIOXIDE

(75) Inventors: Frederick P. Mussari, Melbourne, FL (US); Aaron Zahn, Neptune Beach, FL (US)

(73) Assignee: BCR ENVIRONMENTAL CORPORATION, Jacksonville, FL (US)

( * ) Notice: Subject to any disclaimer, the term of this patent is extended or adjusted under 35 U.S.C. 154(b) by 1339 days.

(21) Appl. No.: 13/643,663

(22) PCT Filed: Apr. 27, 2011

(86) PCT No.: PCT/US2011/034116
§ 371 (c)(1),
(2), (4) Date: Dec. 3, 2012

(87) PCT Pub. No.: WO2011/139758
PCT Pub. Date: Nov. 10, 2011

(65) Prior Publication Data
US 2013/0134092 A1    May 30, 2013

Related U.S. Application Data

(60) Provisional application No. 61/328,363, filed on Apr. 27, 2010.

(51) Int. Cl.
*C02F 1/72* (2006.01)
*C02F 1/76* (2006.01)
(Continued)

(52) U.S. Cl.
CPC .................. *C02F 1/72* (2013.01); *C02F 9/00* (2013.01); *C02F 1/763* (2013.01); *C02F 1/78* (2013.01);
(Continued)

(58) Field of Classification Search
CPC .... C02F 1/72; C02F 1/722; C02F 1/76; C02F 1/63; C02F 1/78; C02F 3/006;
(Continued)

(56) References Cited

U.S. PATENT DOCUMENTS 5,246,597 A     9/1993  Jenson et al.
5,837,142 A  *  11/1998  Mullerheim ............ C02F 1/444
                                                           210/173

(Continued)

FOREIGN PATENT DOCUMENTS

EP     0887314 A2   12/1998
GB     2161154 A     1/1986
(Continued)

OTHER PUBLICATIONS

Japanese Office Action dated Nov. 25, 2014 for Application No. 2013-508203.
(Continued)

*Primary Examiner* — Lucas A Stelling
(74) *Attorney, Agent, or Firm* — Lando & Anastasi, LLP

(57) ABSTRACT

Disclosed herein are systems and processes for treating a Waste Stream comprising biosolids, the Waste Stream provided at varying flow rates and solids concentrations so as to achieve an SOUR of 1.5 mg $O_2$/g/hr or less and an ORP of at least +300 mV. The system includes a biosolids manipulation device to adjust the volume of suspended solids as a percent of the total volume of the Waste Stream to five (5) percent or less; a chemical oxidant feed device to dose the Waste Stream with an oxidant such as chlorine dioxide, ozone, or similar oxidant, and a treatment vessel associated with said chemical oxidant feed device through which said Waste Stream flows, wherein said chemical oxidant feed device and said treatment device are configured so as to achieve a dose rate between 25 and 200 parts per million of
(Continued)

the Waste Stream and substantially complete mixing of the oxidant within 30 seconds of dose delivery in the treatment vessel.

10 Claims, 1 Drawing Sheet

(51) Int. Cl.
| | |
|---|---|
| *C02F 9/00* | (2006.01) |
| *C02F 11/06* | (2006.01) |
| *C02F 11/122* | (2019.01) |
| *C02F 11/127* | (2019.01) |
| *C02F 1/78* | (2006.01) |
| *C02F 3/00* | (2006.01) |
| *C02F 3/12* | (2006.01) |
| *C02F 3/28* | (2006.01) |
| *C02F 3/30* | (2006.01) |

(52) U.S. Cl.
CPC ............ *C02F 3/006* (2013.01); *C02F 3/1221* (2013.01); *C02F 3/28* (2013.01); *C02F 3/308* (2013.01); *C02F 11/06* (2013.01); *C02F 11/122* (2013.01); *C02F 11/127* (2013.01); *C02F 2209/003* (2013.01); *C02F 2209/04* (2013.01); *C02F 2209/10* (2013.01); *C02F 2209/22* (2013.01); *C02F 2303/24* (2013.01); *Y02W 10/15* (2015.05)

(58) Field of Classification Search
CPC ........ C02F 3/1221; C02F 3/308; C02F 11/06; C02F 11/122; C02F 11/127; C02F 2209/003; C02F 2209/04; C02F 2209/22; C02F 2209/24; C02F 2209/10; C02F 1/763; C02F 9/00; C02F 2303/24; Y02W 10/15
See application file for complete search history.

(56) References Cited

U.S. PATENT DOCUMENTS

| | | | |
|---|---|---|---|
| 5,858,246 A | 1/1999 | Rafter et al. | |
| 5,873,996 A | 2/1999 | Rozelle et al. | |
| 5,914,040 A | 6/1999 | Pescher et al. | |
| 5,972,238 A | 10/1999 | Rimpler et al. | |
| 5,997,750 A | 12/1999 | Rozelle et al. | |
| 6,103,130 A | 8/2000 | Sherman | |
| 6,103,950 A | 8/2000 | Rimpler et al. | |
| 6,132,600 A | 10/2000 | Marchesseault et al. | |
| 6,251,289 B1 | 6/2001 | Sherman | |
| 6,383,399 B2 | 5/2002 | Sherman | |
| 6,444,131 B1 | 9/2002 | Sherman | |
| 6,521,131 B1 | 2/2003 | Hamilton et al. | |
| 6,576,144 B1 | 6/2003 | Vineyard | |
| 6,652,758 B2 | 11/2003 | Krulik | |
| 6,755,973 B2 | 6/2004 | Allen | |
| 6,783,679 B1 * | 8/2004 | Rozich | 210/614 |
| 6,802,976 B2 | 10/2004 | Camp et al. | |
| 6,852,297 B2 | 2/2005 | Gillberg et al. | |
| 7,105,039 B2 | 9/2006 | Decker | |
| 7,285,217 B2 | 10/2007 | Simpson et al. | |
| 7,384,555 B1 | 6/2008 | Yasui et al. | |
| 2002/0148790 A1 | 10/2002 | Krulik | |
| 2002/0189998 A1 | 12/2002 | Haase et al. | |
| 2003/0189006 A1 | 10/2003 | Allen | |
| 2003/0209499 A1 | 11/2003 | Haase | |
| 2004/0154965 A1 | 8/2004 | Baum et al. | |
| 2005/0115895 A1 | 6/2005 | Simpson et al. | |
| 2005/0244328 A1 * | 11/2005 | Schmitz | A61L 2/20 423/477 |
| 2005/0279706 A1 * | 12/2005 | Reimers et al. | 210/631 |
| 2006/0289349 A1 | 12/2006 | Hughes | |
| 2007/0090030 A1 * | 4/2007 | Teran et al. | 210/86 |
| 2007/0256979 A1 | 11/2007 | Condit | |
| 2010/0150818 A1 | 6/2010 | Haase | |
| 2011/0309017 A1 | 12/2011 | Hassler et al. | |
| 2012/0168375 A1 | 7/2012 | Zhang et al. | |

FOREIGN PATENT DOCUMENTS

| | | |
|---|---|---|
| JP | 2000140894 A | 5/2000 |
| JP | 2002361281 A | 12/2002 |
| JP | 2005199258 A | 7/2005 |
| JP | 2006026524 A | 2/2006 |
| JP | 2006035069 A | 2/2006 |
| JP | 2007136276 | 6/2007 |
| JP | 2007136276 A * | 6/2007 |
| JP | 2007283223 | 11/2007 |
| JP | 2010029860 A | 2/2010 |
| KR | 10-2005-0057735 | 6/2005 |
| KR | 10-0487582 | 2/2006 |
| WO | 1996037440 A1 | 11/1996 |
| WO | 1997041960 A1 | 11/1997 |
| WO | 1998030502 A1 | 7/1998 |
| WO | 2000075083 A1 | 12/2000 |
| WO | 2002026640 A1 | 4/2002 |
| WO | 2003086983 A1 | 10/2003 |
| WO | 2003095375 A1 | 11/2003 |
| WO | 2004049116 A2 | 6/2004 |
| WO | 2004071960 A2 | 8/2004 |
| WO | 2005/118490 A2 | 12/2005 |
| WO | 2011130553 A2 | 10/2011 |
| WO | 2011139758 A2 | 11/2011 |
| WO | 2012004772 A2 | 1/2012 |

OTHER PUBLICATIONS

Decision for Rejection dated Nov. 4, 2014 for Chinese Application No. 201180021728.7.
Supplementary European Search Report dated Jun. 23, 2014 for Application No. 11777950.4.
International Search Report dated Feb. 8, 2012 for Application No. PCT/US2011/034116.
Written Opinion of the International Searching Authority dated Feb. 8, 2012 for Application No. PCT/US2011/034116.
Chinese Notification of First Office Action dated Sep. 3, 2013 for Application No. 201180021728.7.
European Examination Report dated Jul. 10, 2015 for Application No. 11777950.4, 5 pages.
Second Office Action dated May 9, 2014 for Chinese Application No. 201180021728.7 (with English translation).
Decision of Rejection dated Sep. 29, 2015 in Japanese Application No. 2013-508203 (with English translation).

* cited by examiner

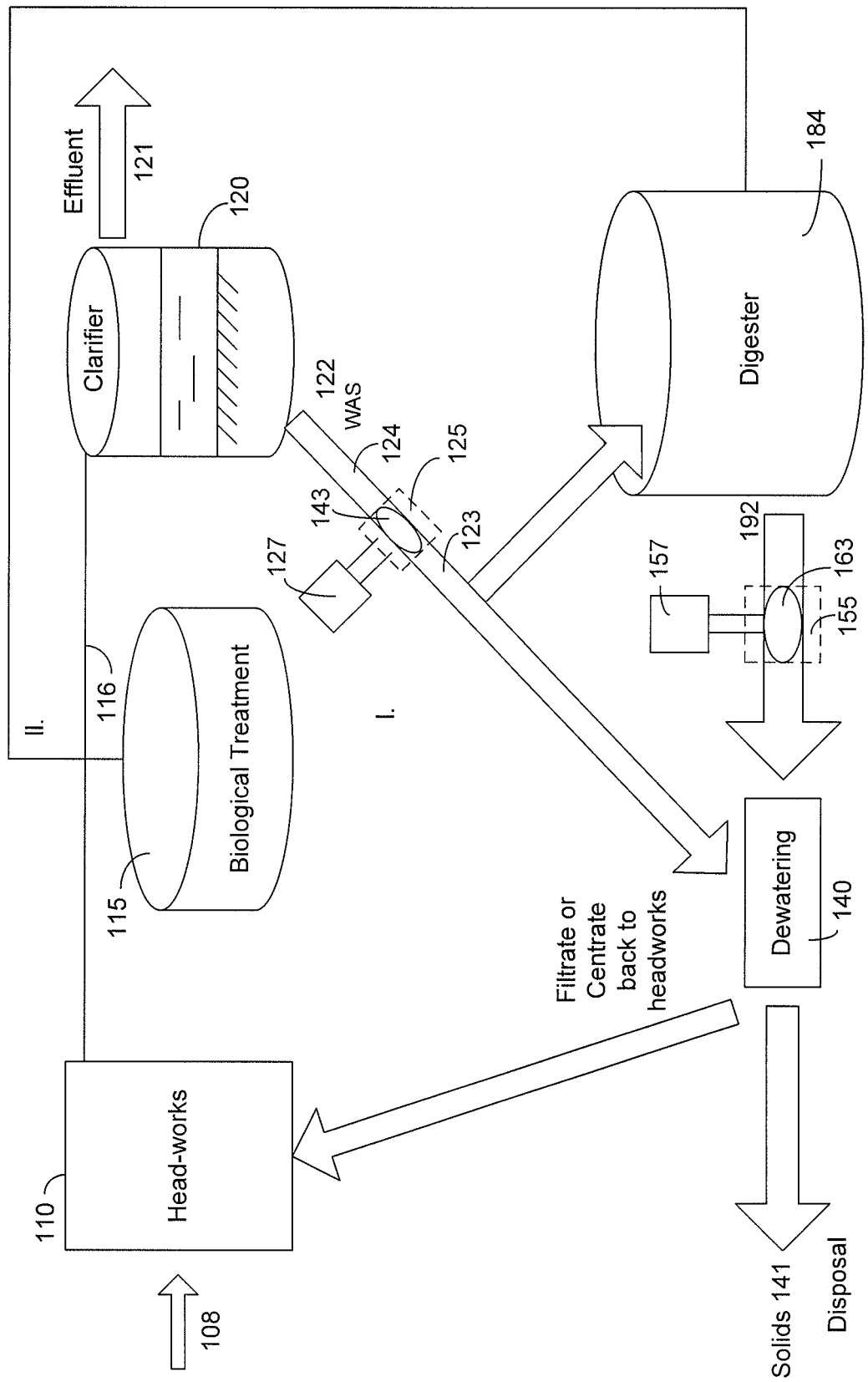

WASTEWATER TREATMENT APPARATUS TO ACHIEVE CLASS B BIOSOLIDS USING CHLORINE DIOXIDE

CROSS-REFERENCE TO RELATED APPLICATIONS

This application is a U.S. national stage application and claims the benefit under 35 U.S.C. § 371 of PCT/US2011/034116, titled WASTEWATER TREATMENT APPARATUS TO ACHIEVE CLASS B BIOSOLIDS USING CHLORINE DIOXIDE, filed Apr. 27, 2011, which claims priority to U.S. Provisional Application Ser. No. 61/328,363, titled WASTEWATER TREATMENT APPARATUS TO ACHIEVE CLASS B BIOSOLIDS USING CHLORINE DIOXIDE, filed Apr. 27, 2010, which patent applications are hereby incorporated herein by reference in their entireties for all purposes.

FIELD

This invention relates to wastewater, and more specifically to a means of wastewater treatment.

BACKGROUND

Certain processes involved in wastewater treatment produce high viscosity slurries, or sludges, and low suspended solid effluents (each a "Waste Stream"). After treatment, the Waste Stream may be deposited in landfills, used for certain agricultural purposes or returned to the surrounding environment. In the U.S., Federal regulations mandate the treatment of these Waste Streams in order to remove achieve specific standards. Two specific methods for measuring the degree of treatment of Waste Streams are the Specific Oxygen Uptake Rate ("SOUR") and the Oxidation Reduction Potential ("ORP"). Conventional techniques do not provide a cost effective and timely solution for treatment of Waste Streams to specific SOUR and ORP standards. Consequently, there is a need in the wastewater treatment industry and other industries treating Waste Streams to more efficiently achieve these specific results.

SUMMARY

The inventors have discovered that the efficiency of the administration of chemical oxidants such as chlorine dioxide for treating biosolids in a wastewater sample increases dramatically when the percentage of biosolids is less than 5 percent and when the chemical oxidant is rapidly dispersed in the sample. For example, they have found that large batch treatments where chemical oxidants are mixed in a batch wastewater sample over the course of a minute had much lower oxygen/reduction potential, as well as lower disinfection efficiency than the same sample in which the same amount of chemical oxidant that is added on a flow per portion continuous basis. it was unexpected that addition on a flow per portion continuous basis such that rapid dispersal of chemical oxidant is achieved, dramatically increased disinfection efficiency As used herein, the term "rapid dispersal" or "rapidly disperse" are used interchangeably and refer to the substantially uniform dispersal of chemical oxidant in the Waste Stream within 30 seconds or less, 20 seconds or less, 10 seconds or less, or 5 seconds or less.

Not to be bound by any mechanistic theory, it is the inventors belief that by providing for the rapid dispersal of the chemical oxidant in a waste stream, versus administration of chemical oxidant in a batch system, prevents the unnecessary degradation of the oxidation potential of the chemical oxidant at only a portion of a sample before the chemical oxidant is sufficiently mixed in the sample. It is believed that the oxidizing potential is unnecessarily used up on organic materials at a portion of the sample whereby oxidation of target microbes is diminished. According to another embodiment, chemical oxidant is added to the Waste Stream such that the dispersal rate of the chemical oxidant is higher than the degradation rate of the chemical oxidant.

In one embodiment, the invention pertains to a treatment apparatus to reduce oxygen uptake levels and to increase the ORP of the waste stream is disclosed, consisting of: 1) the mechanical manipulation of the characteristics of the Waste Stream to achieve a specific proportion of concentration of dissolved and suspended solids to liquid, 2) an oxidant feed system (utilizing chlorine dioxide, ozone, or similar oxidant) to dose the Waste Stream with a dose rate between 25 and 200 parts per million ("PPM") of the Waste Stream, and 3) a treatment vessel of volumetric dimensions proportional to the flow rate of the Waste Stream. The embodiment of this invention comprises a combination of features and advantages intended to address various shortcomings conventional Waste Stream treatment systems in achieving standards of SOUR and ORP.

The Wastewater Treatment Process

The wastewater treatment process consists of a number of sequential steps.

Screening and Primary Treatment

Typically, wastewater enters a wastewater treatment plant at the headworks. The headworks acts as a primary grit and foreign matter removal system for a wastewater treatment plant. From the headworks wastewater is transferred to a form of biological treatment unit ("BTU") (i.e. an oxidation ditch, sequential batch reactor, member bioreactor, etc.). In the BTU Nutrients are removed from the wastewater.

Nitrogen and Phosphorous ("Nutrient") Removal

The removal of nitrogen is effected through the biological oxidation of nitrogen from ammonia (nitrification) to nitrate, followed by the reduction of nitrate to nitrogen gas (denitrification). Nitrogen gas is released to the atmosphere and thus removed from the water.

Nitrification itself is a two-step aerobic process, each step facilitated by a different type of bacteria. The oxidation of ammonia ($NH_3$) to nitrite ($NO_2^-$) is most often facilitated by *Nitrosomonas* spp. (nitroso referring to the formation of a nitroso functional group). Nitrite oxidation to nitrate ($NO_3^-$), though traditionally believed to be facilitated by *Nitrobacter* spp. (nitro referring the formation of a nitro functional group), is now known to be facilitated in the environment almost exclusively by *Nitrospira* spp.

Denitrification requires anoxic conditions to encourage the appropriate biological communities to form. It is facilitated by a wide diversity of bacteria. Sand filters, lagooning and reed beds can all be used to reduce nitrogen, but the activated sludge process (if designed well) can do the job the most easily. Since denitrification is the reduction of nitrate to dinitrogen gas, an electron donor is needed. This can be, depending on the wastewater, organic matter (from faeces), sulfide, or an added donor like methanol. Many sewage treatment plants use axial flow pumps to transfer the nitrified mixed liquor from the aeration zone to the anoxic zone for denitrification. These pumps are often referred to as Internal Mixed Liquor Recycle pumps (IMLR pumps).

Phosphorus removal is important as it is a limiting nutrient for algae growth in many fresh water systems. It is also particularly important for water reuse systems where high phosphorus concentrations may lead to fouling of downstream equipment such as reverse osmosis filters.

Phosphorus can be removed biologically in a process called enhanced biological phosphorus removal. In this process, specific bacteria, called polyphosphate accumulating organisms (PAOs), are selectively enriched and accumulate large quantities of phosphorus within their cells (up to 20% of their mass). When the biomass enriched in these bacteria is separated from the treated water, these Biosolids have a high fertilizer value.

Phosphorus removal can also be achieved by chemical precipitation, usually with salts of iron (e.g. ferric chloride), aluminum (e.g. alum), or lime. This may lead to excessive sludge productions as hydroxides precipitates and the added chemicals can be expensive. Chemical phosphorus removal requires significantly smaller equipment footprint than biological removal, is easier to operate and is often more reliable than biological phosphorus removal.

After treatment to remove Nutrients, the wastewater and accumulated organic matter is sent to a clarification process. Clarification is where the Waste Streams of wastewater treatment are separated and typically go to some type of conventional treatment such as aerobic or anaerobic digestion to reduce the biological demand for oxygen and achieve specific standards for oxygen uptake, as demonstrated by the SOUR test.

According to another embodiment, the invention pertains to a wastewater treatment system that includes a headworks for receiving raw sewage wastewater having biosolids and a biological treatment station that is in fluid communication with said headworks. The system also includes a clarifier in fluid communication with the headworks for concentrating biosolids from the raw sewage wastewater. In a typical embodiment, the clarifier is in fluid communication with and downstream of the biological treatment station. Once the raw sewage wastewater has been subjected to biological treatment and clarification, the biosolid sample is considered to be waste activated sludge (WAS). Concurrent with or subsequent to the clarification process, WAS is produced in a wastewater stream and the amount of biosolids is controlled. Typically, the WAS is adjusted to contain anywhere from 0.5 to 5 percent biosolids, either weight/volume (w/v) or by weight (weight percent) depending what is indicated. In a specific embodiment, the biosolid content of the WAS is 1-3 percent. The system also includes a first conduit for transporting WAS away from the clarifier. The oxidant addition is associated with the first conduit so as to deliver a predetermined dosage of chlorine dioxide, or other oxidant (e.g. to the WAS in the first conduit) at a treatment zone.

Specific Oxygen Uptake Rate (SOUR)

The Specific Oxygen Uptake Rate (SOUR), also known as the oxygen consumption or respiration rate, is defined as the milligram of oxygen consumed per gram of volatile suspended solids (VSS) per hour. This quick test has many advantages; rapid measure of influent organic load and biodegradability, indication of the presence of toxic or inhibitory wastes, degree of stability and condition of a sample, and calculation of oxygen demand rates at various points in the aeration basin.

The test was originally developed as a plant control parameter. SOUR is now also used as an alternative test method to meet the vector attraction reduction requirement imposed by 40 CFR Part 503 standards for the use or disposal of sewage sludge. This requirement reduces the potential of spreading infectious disease agents by vectors (e.g. insects, rodents, and birds). SOUR-503 is defined as milligram of oxygen consumed per gram of total solids (TS) per hour. The SOUR test is suitable for solids less than 2% total solids concentration and is used as an indicator of oxygen demand, similar to a test for Biological Oxygen Demand, and is not meant to limit the solids concentration of the the target waste stream.

Oxidation Reduction Potential (ORP)

Oxidation Reduction potential (also known as redox potential, oxidation/reduction potential or ORP) is a measure of the tendency of a chemical species to acquire electrons and thereby be reduced. ORP is measured in volts (V) or millivolts (mV). Each species has its own intrinsic reduction potential; the more positive the potential, the greater the species' affinity for electrons and tendency to be reduced.

Parts Per Million (PPM)

Parts per million is a way of expressing very dilute concentrations of substances. Just as percent means out of a hundred, so parts per million or ppm means out of a million. Usually describes the concentration of something in water or soil. One ppm is equivalent to 1 milligram of something per liter of water (mg/l) or 1 milligram of something per kilogram soil (mg/kg).

CT

When the biocidal effect of disinfectants are considered, the major considerations are the disinfectant concentration, and the time needed to inactivate exposed organisms. This is generally expressed by the formula: $k=C^n \times t$, where $C$=the disinfectant concentration (mg/L), $n$=the coefficient of dilution, $t$=time (minutes) required to inactivate a specified percentage of microorganism, and $k$=a constant for a specific microorganism exposed to the disinfectant under specified conditions.

Chemical disinfection can be considered to have the characteristics of a first-order chemical reaction (Chick's Law), in actual practice, this is rarely observed, even in disinfection of drinking water. Other models have been applied to disinfection kinetics to account for these deviations (Hom Model), but these typically do not account for decay of or demand on a disinfectant or oxidant.

Although it is standard practice in the field to utilize an oxidant in the treatment of a waste sample to elevate the oxidation/reduction potential and effect disinfection of the waste sample, the inventors have discovered that the degree at which certain oxidants, such as chlorine dioxide, react with the material in the waste stream and are reduced requires the almost instantaneous addition of the oxidant and complete mixing in a short period of time. In one embodiment, the present invention provides for the addition of sufficient concentrations of oxidant and mixing with a waste stream so that all of the material comes in contact with the oxidant within 10-200 seconds, and all second integers there between. This method produces substantially different results than other methods in which oxidant addition and mixing takes place over a period as short as 3 minutes. In an even more specific embodiment, the material comes in contact with the chemical oxidant in 30 seconds or less, or 20 seconds or less, or 10 seconds or less or 5 seconds or less.

According to another embodiment, the invention pertains to a wastewater treatment system that includes a headworks for receiving raw sewage wastewater having biosolids and a biological treatment station that is in fluid communication with said headworks. The system also includes a clarifier in fluid communication with the headworks for concentrating biosolids from the raw sewage wastewater. In a typical embodiment, the clarifier is in fluid communication with and downstream of the biological treatment station. Once the raw sewage wastewater has been subjected to biological treatment and clarification, the biosolid sample is considered to be waste activated sludge ("WAS"). Typically, the WAS contains anywhere from 0.5 to 5 percent biosolids. In a specific embodiment, the biosolid content of the WAS is 1-3 percent. The system also includes a first conduit for transporting WAS away from the clarifier. The oxidant addition is associated with the first conduit so as to deliver a predetermined dosage of chlorine dioxide, or other oxidant (e.g. ozone) to the WAS in the first conduit. The system is equipped with a chemical oxidant source associated with the conduit so as to deliver a predetermined dosage of chemical oxidant. Following chemical oxidant treatment, the WAS is considered to be a treated biosolid sample which meet Class B biosolid standards as defined by the U.S. 40 CFR Part 503. Optionally, the system also includes a dewatering device (e.g., a belt filter press or centrifuge device) in fluid communication with the first conduit for further removing water from the treated biosolid sample. Moreover, the system optionally includes a second conduit for transporting the concentrated treated biosolid sample from the dewatering device.

Alternatively, depending on the configuration of a particular wastewater treatment facility, the process can be used to treat digested sludge, i.e., sludge that has been treated in an anaerobic or aerobic digester, to produce Class B biosolids. In a specific embodiment, primary wastewater, i.e., wastewater not subjected to biological treatment, is transported directly to a digester to produce digested sludge. The digested sludge is then subjected to an oxidant treatment zone.

BRIEF DESCRIPTION OF THE DRAWINGS

FIG. 1 shows a schematic of a wastewater treatment system that utilizes a chlorine dioxide generating device in a waste activated sludge conduit for purposes of producing Class B biosolids.

DETAILED DESCRIPTION OF ILLUSTRATED EMBODIMENTS

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

A specific example of a wastewater treatment system for producing a Class B Biosolid sample is shown in FIG. 1. In this specific example, wastewater 108 first enters the headworks 110 and then is transferred to a biological treatment station 115. The biological treatment station 115 functions primarily to remove biosolid-dissociated nutrients (and a low percentage of biosolid-associated nutrients) in the wastewater to produce a nutrient-reduced wastewater sample 116. The nutrient-reduced wastewater sample 116 is transferred to a clarifier 120, where the nutrient-reduced wastewater sample 116 is separated into an effluent component 121 and a WAS component 122. The effluent component 121 is either returned to the headworks 110 or is discarded.

According to scheme I., the WAS component 122 is transported in a conduit 124 and subjected to a oxidant treatment zone 125 that is fed by an on-site oxidant generator 127 in fluid communication with the oxidant treatment zone 125. The biosolids content of the WAS 122 is between 0.5 to 5 percent solids. The conduit 124 includes an oxidant administration component 143, which may be integrated or separate to the conduit, wherein the chemical oxidant is administered to the WAS in a controlled manner. In particular, the component 143 is configured and associated with the oxidant generator 127 such that the chemical oxidant is administered to WAS to achieve dispersal of the chemical oxidant in the WAS within 30 seconds or less, 20 seconds or less, 15 seconds or less, 10 seconds or less, 5 seconds or less, or 2 seconds or less.

Following, oxidant treatment, the WAS 122 is transported to a dewatering device 140 (such as a belt filter press or centrifuge device) where more water is removed from the WAS to achieve a concentrated biosolids sample 141 having 12-30 percent biosolids. The, concentrated biosolids sample achieved prior to the dewatering station 140 has a higher ORP and lower SOUR.

According to an alternative embodiment, scheme II, raw wastewater is delivered to a digester 184, either prior or after biological treatment. The raw wastewater is treated in the digester 184 to produce digested sludge 192. The digested sludge may have 0.5 to 5 percent biosolids. A conduit 164 transports digested sludge 192 away from the digester 184. The conduit 164 includes a oxidant treatment zone 155. An oxidant generator 157 deliver the predetermined dosages to the oxidant treatment zone 155 at the mixing component 163. The mixing component 163 is configured similar to component 143 as discussed above. The digested sludge 192 is transported to a dewatering device 140, where further water is removed to obtain a concentrated biosolids sample 141 that may be classified as Class A or Class B biosolids.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The disclosure of any cited reference, including related applications, is incorporated herein in its entirety to the extent not inconsistent with the teachings herein.

The invention claimed is:

1. A method for treating a waste stream comprising biosolids so as to achieve a SOUR of 1.5 mg $O_2$/g/hr or less and an ORP of at least +300 mV in the waste stream, the waste stream being provided at varying flow rates and solids concentrations, the method comprising:
    adjusting a suspended solids content as a percent of the total volume of the waste stream to five (5) weight percent or less;
    generating chlorine dioxide in an on-site generator; and
    delivering the chlorine dioxide to a conduit comprising a treatment zone through which the waste stream flows so as to achieve a dose rate between 25 and 200 parts per million of the waste stream in the treatment zone and complete dispersal of chlorine dioxide in the waste stream within 30 seconds of delivery to the conduit to provide a treated biosolids sample.

2. The method of claim 1, wherein the delivery is such to achieve complete dispersal of chlorine dioxide within 10 seconds.

3. The method of claim 1, further comprising dewatering the treated biosolids sample to produce a concentrated biosolids sample.

4. The method of claim 3, wherein dewatering the treated biosolids sample produces a concentrated biosolids sample having 12-30% biosolids.

5. The method of claim 3, wherein the concentrated biosolids sample is classified as at least one of Class A and Class B biosolids.

6. The method of claim 1, wherein adjusting a suspended solids content as a percent total volume of the waste stream comprises adjusting a suspended solids content to 1-3 weight percent.

7. The method of claim 1, wherein delivering the chlorine dioxide to the conduit achieves complete dispersal of chlorine dioxide in the waste stream within 20 seconds of dose delivery.

8. The method of claim 1, wherein delivering the chlorine dioxide to the conduit achieves complete dispersal of chlorine dioxide in the waste stream within 15 seconds of dose delivery.

9. The method of claim 1, wherein delivering the chlorine dioxide to the conduit achieves complete dispersal of chlorine dioxide in the waste stream within 5 seconds of dose delivery.

10. The method of claim 1, wherein delivering the chlorine dioxide to the conduit achieves complete dispersal of chlorine dioxide in the waste stream within 2 seconds of dose delivery.

\* \* \* \* \*